United States Patent [19]

Kamoshita

[11] Patent Number: 4,623,596
[45] Date of Patent: Nov. 18, 1986

[54] CELL STACK FOR FUEL CELLS

[75] Inventor: Tomoyoshi Kamoshita, Yokosuki, Japan

[73] Assignee: Fuji Electric Corporate Research & Development Ltd., Yokosuka, Japan

[21] Appl. No.: 757,893

[22] Filed: Jul. 23, 1985

[30] Foreign Application Priority Data

Jul. 28, 1984 [JP]  Japan .................. 59-115573[U]

[51] Int. Cl.$^4$ ............................................. H01M 8/04
[52] U.S. Cl. ...................................... 429/26; 429/34; 429/39
[58] Field of Search ................... 429/34, 35, 37–39, 429/18, 26

[56] References Cited

U.S. PATENT DOCUMENTS

| 4,324,844 | 4/1982 | Kothmann | 429/26 |
| 4,414,294 | 11/1983 | Guthrie | 429/35 |
| 4,444,851 | 4/1984 | Maru | 429/34 X |
| 4,467,018 | 8/1984 | Schroll | 429/18 |
| 4,476,197 | 10/1984 | Herceg | 429/34 X |
| 4,478,918 | 10/1984 | Ueno et al. | 429/38 |
| 4,548,874 | 10/1985 | Katz et al. | 429/18 |

Primary Examiner—Anthony Skapars
Attorney, Agent, or Firm—Brumbaugh, Graves, Donohue & Raymond

[57] ABSTRACT

A fuel cell stack is formed by a plurality of fuel cell blocks each of which comprises a plurality of fuel cell units laminated together. Each cell block has its own set of manifolds for supply and return of the reaction gases. Each manifold is insulated from the others and from the main gas line to which it is connected. When a cooling system is used, the various cooling elements are similarly electrically insulated from one another and from their main conduit.

4 Claims, 8 Drawing Figures

CELL STACK FOR FUEL CELLS

This invention relates to fuel cells and more specifically to a stack of fuel cells.

BACKGROUND OF THE INVENTION

To achieve voltages higher than that of a single cell, it is usual to form a stack of single fuel cells. In a fuel cell stack, a plurality of pipes, or manifolds, needs to be associated with the stack for supplying the fuel and oxidizing gases to the cells and recovering the spent gases.

In such arrangements, it is important to avoid the buildup of excessive voltages on the piping and excessive leakage currents in the piping which reduce the efficiency of the stack. Complicating these problems is the fact that some of the common electrolytes used in such cells, for example phosphoric acid, escape and tend to deposit on the inner walls of the piping and the insulation where they reduce the surface resistance of the insulation, which increases leakage current.

The present invention provides a fuel cell stack in which there is avoided the problem of voltage buildup in the piping and of leakage because of poor insulation.

SUMMARY OF THE INVENTION

The invention comprises a stack of fuel cells which comprises a plurality of cell blocks each having a plurality of unit or single cells. Each cell block has its own set of manifolds to supply and return the reaction gases and the various manifolds are individually electrically insulated from the cell blocks and from one another. Moreover, each manifold is separately electrically insulated from its main line.

When liquid cooling is employed, the cooling system is designed to maintain the electrical isolation of the manifolds.

DETAILED DESCRIPTION OF THE INVENTION

Figure 6:
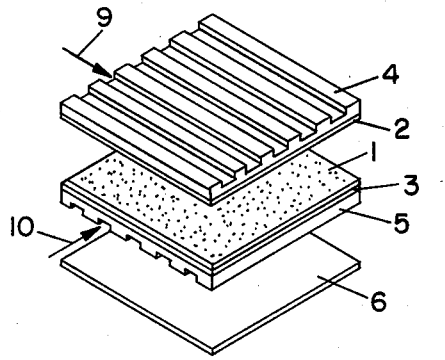
FIGS. 6 and 7 are perspective views of two known forms of unit cells that can be used to form the cell blocks for use in the invention.

With reference now to the drawing, FIG. 6 shows a ribbed electrode type of unit cell, one of the popular forms. It comprises a pair of gas permeable carbon plates 4, 5, each having longitudinal ribs between which are grooves which are gas permeable. The plates are aligned so that the ribs on one plate extend perpendicular to the ribs of the other plate. Sandwiched between the plates are a fuel stack catalyst layer 2, a matrix 1 and an air catalyst layer 3. The fuel gas is flowed along the grooves of ribbed plate 4 for the fuel gas to permeate into the fuel catalyst layer 2 and air is flowed along the grooves of ribbed plate 5 to permeate into the air catalyst layer 3. A separator plate 6 made of a gas-impermeable conductor is included which is used to separate unit cells as they are stacked one above the other. The separator plate serves to confine the gases to individual cells so that mixing is avoided except as desired.

Figure 7:
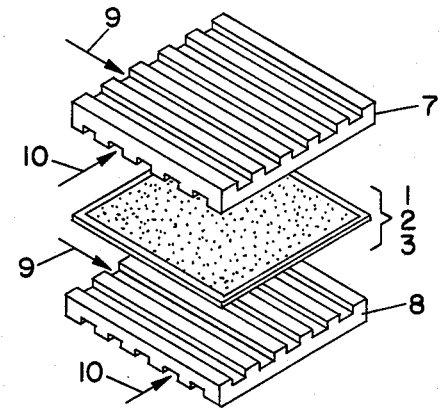

FIG. 7 shows the ribbed separator type of unit cell, another popular form. This form includes a pair of gas impermeable carbon plates 7 and 8 each of whose two main surfaces include a series of longitudinal ribs, the ribs on one of the two surfaces extending in a direction perpendicular to the direction of extension of the ribs on the other surface. Such plates are termed bipolar plates in the art. Moreover, the two plates are aligned so that the ribs on the lower surface of the plate 7 run perpendicular to the ribs on the upper surface of plate 8. Sandwiched between the two plates 7 and 8 are the fuel electrode catalyst layer 2, the matrix layer 1 and the air electrode catalyst layer 3, as before. The fuel gas is flowed through the grooves in the upper surfaces of electrode 7 and 8, indicated by grooves 9, air is flowed through the grooves in the lower surfaces of electrodes 7 and 8, indicated by arrows 10. In this form, the plates 7 and 8 also serve as the separators between cells as unit cells are stacked, and the gas flowed through the grooves in the upper surface of the electrode would be used in the cell located above the cell shown while the gas flowed through the grooves of the bottom surface of electrode 8 would be used in the stack in the unit cell below the one shown.

Since the invention is not dependent on the particular choice of gases used in the cell, there will be no discussion on the choice of gases.

Figure 8:
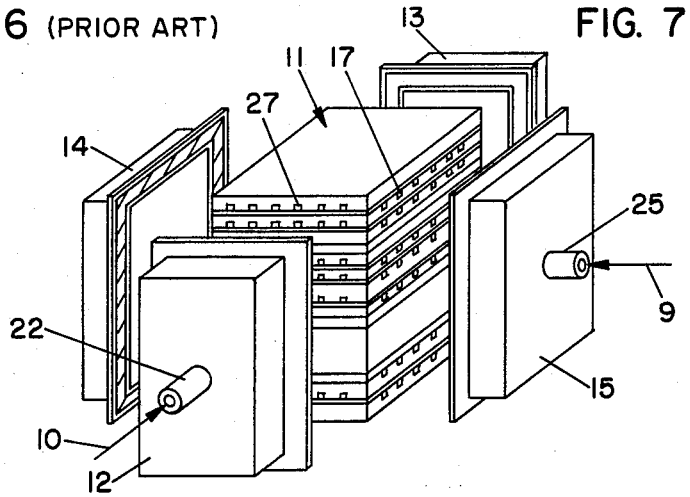
FIG. 8 shows in perspective the integration of the unit cell of FIG. 1 into a fuel cell stack in prior art fashion.

FIG. 8 shows the way that unit cells have typically been stacked in the prior art. In this instance, the unit cells ar of the ribbed separator type just discussed with reference to FIG. 7. A plurality of unit cells are stacked to form the stack 11. The cells are typically connected in series so that their number determines the voltage developed by the stack. The output is generally derived from connections to the end plates of the stack. Disposed about the periphery of the stack are two pairs of manifolds, or piping assemblies. The first pair comprising oppositely disposed manifolds 12 and 13 supply and return air, respectively, the second pair comprising oppositely disposed manifolds 14 and 15 supply and return the fuel gas, respectively. Each manifold is provided on its outside with the main supply pipe which divides to provide at its inside a branch for each of the unit cells. In a working cell, the manifolds are secured gas tight to the surfaces of the stack, rather than being separated as is shown here for ease of exposition. In the drawing, only supply pipes 22 and 25 are seen, return pipes 23 and 24 being hidden. In the stack, the fuel gas and air are flowed along grooves 17 and 27 at right angles to one another, as discussed with reference to FIG. 7.

In the arrangement shown in FIG. 8, the manifolds would each be of a conductive material and each would be maintained at ground potential. Accordingly, the manifolds need to be insulated from the surface of the stack to which they are sealed, and such insulation needs to withstand the voltage developed by the stack, which may be several hundred volts in large stacks. One problem that is experienced is that the electrolyte in the matrix, typically phosphoric acid, scatters from the matrix into the reacting gases during operation and thereafter tends to deposit on the inner surface of the manifold and on the insulation, thereby reducing its surface resistance and increasing the tendency for leakage currents to flow. This leakage current represents loss and so reduces the efficiency of the stack. It also promotes degradation of the insulation and increases the risk of short circuits in the stack.

The invention involves dividing the cells needed for a stack of given high voltage into a number of cell blocks, typically at least three, and associating with each block its own set of four branch manifolds each tightly sealed to and insulated from its cell block. The branch manifolds are all insulated from one another and from their supply and return pipes.

Figure 1:
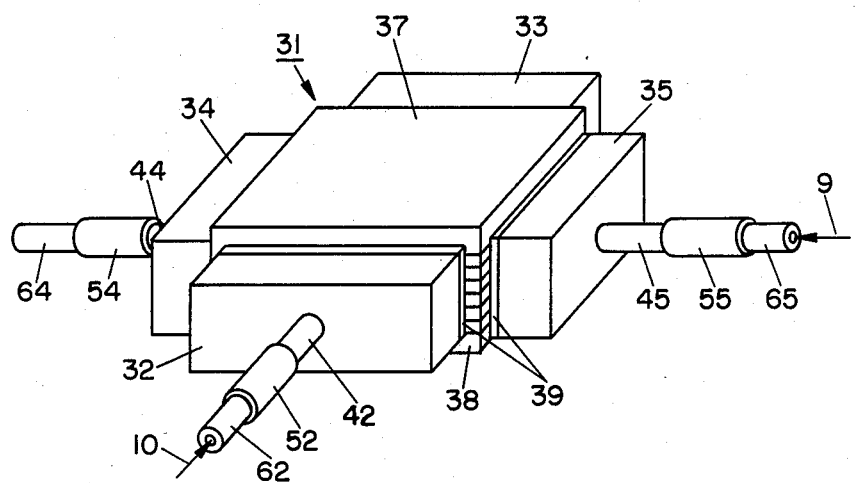
FIG. 1 and FIG. 2 show, in perspective, respectively, a single block of cells and an array of such blocks to form a stack, in accordance with the invention.

FIG. 1 shows a single block. It comprises a stack 37 having a predetermined number of unit cells, stacked as shown in FIG. 7. Typically, there will be between five and fifteen unit cells to a block. Associated with the cell stack are the air supply and return manifolds 32 and 33 and the fuel supply and return manifolds 34 and 35. Each is tightly sealed to a different one of the four sides of the stack by way of an insulating seal 39. Moreover, each cell block is provided at opposite ends with conductive gas-impermeable end plates 37 and 38. Connection pipes 42, 43, 44 and 45 are connected to manifolds 32, 33, 34 and 35, respectively, and supply the grooves of the cells, as discussed previously. Moreover, each of the connection pipes is connected to a branch of its supply or return pipe 62, 63, 64 and 65, as appropriate, by way of an insulating section 52, 53, 54 and 55, respectively. In this way each manifold is insulated from every other manifold as well as from its supply or return main pipe. The output voltage of each block is developed across the end plates.

Figure 2:
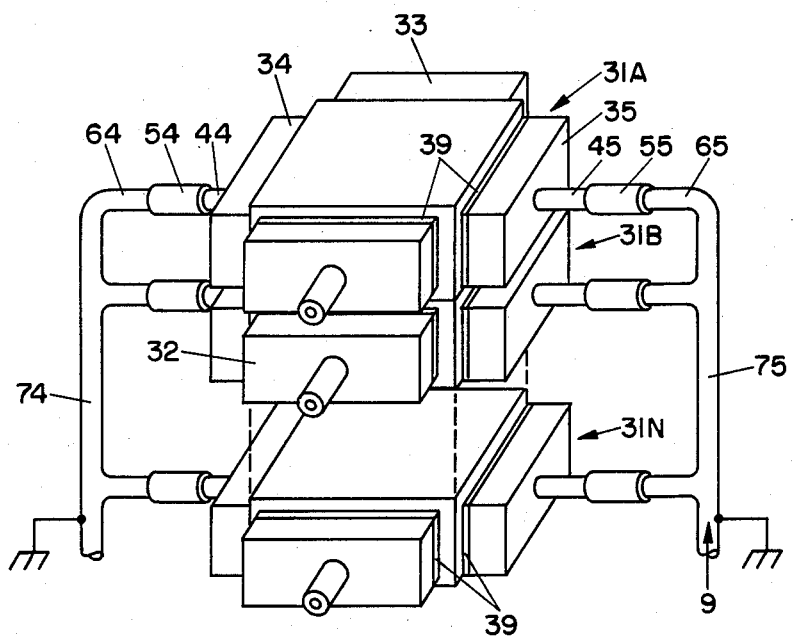

FIG. 2 shows a stack made up of a plurality of blocks 31A, 31B ... 31N of the kind described with reference to FIG. 1. The blocks are stacked end plate on end plate to form a series combination. The branches associated with the corresponding manifolds are connected to a common supply or return main pipe. In the drawing, there are shown only the main supply pipe 75 supplying the branches corresponding to branch 65 and the main return pipe 74 for the branches corresponding to branch 64. There would be similar supply and return main pipes for the branches corresponding to branches 62 and 63. When air is one of the component gases, it is possible to use the atmosphere for supply and return. The main pipes advantageously are all maintained at ground potential. There is a variety of ways that the separate manifolds may be sealed to the periphery of the cell blocks and several will be described as indicative of the general principles involved.

Figure 3:
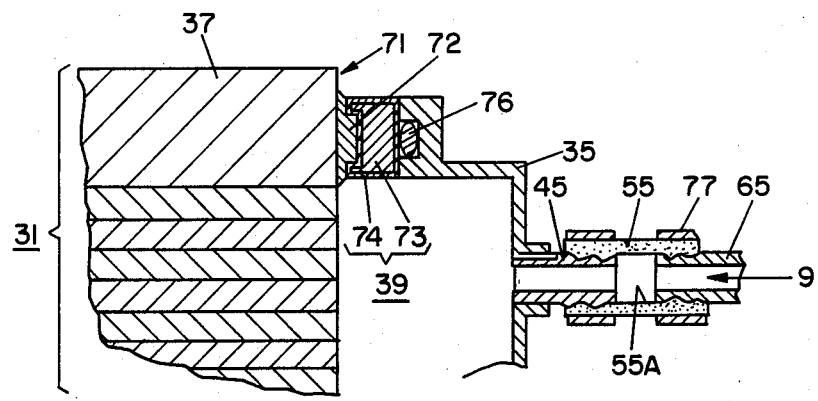
FIGS. 3, 4 and 5 are sectional views illustrating particular details of various constructions of a cell block of the kind shown in FIG. 1.

FIG. 3 is a cross sectional view for a portion of the cell block in the foregoing embodiment to illustrate one form of the manifold seal and of the insulation pipe portion. In the drawing, a manifold seal 39 comprises a frame-like member 73 which is of a metal having a temperature expansion coefficient close to that of the cell block 31 (mainly composed of carbon type conductive material), for instance, an iron-nickel alloy, and which is coated on the surface with a corrosion resistant insulation coating made of fluoro resin of 200-300 um thickness. It is disposed between the manifold 35 and the peripheral surface 71 of the cell block 31 associated with the end plate 37. A recess is provided in the surface of the manifold seal 39 on the side of the circumferential surface 71. Fluoro resin type caulking material 72 of low molecular weight fills the space between the peripheral surface 71 and the manifold seal 39 to make the gap between the surface 71 and the manifold seal 39 gas tight. Furthermore, an o-ring 76 is disposed in an o-ring groove formed between the manifold 35 and the manifold seal 39 to maintain a gas tight state between the manifold 35 and the manifold seal 39. As the coating material 74 for the manifold seal 39, perfluoroethyl ether - polytetrafluoroethylene copolymer (PFA) and the like are suitable. By constituting the insulation and the gas tight structure between the peripheral surface of the cell block and the manifold as described above, any unevenness on the peripheral surface 71 can be compensated for by the caulking material to maintain the gas tightness. Moreover, by constituting the manifold seal of material having a temperature expansion coefficient nearly that of the cell block, the thermal stresses applied to the caulking material 72 can be reduced to improve the stability of the caulking, whereby the corrosion resistance of the frame-like member 73 can be maintained by the coating layer 74 of the manifold seal. This stabilizes the ability of the stack to withstand voltage differences between the cell block 31 and the manifold 35. Furthermore, when the gap between the manifold seal and the manifold is sealed by using an o-ring, thermal stresses resulting between them can be absorbed to maintain the satisfactory gas tightness even when the seal and the manifold are of materials having different temperature expansion coefficients. In the stack described each of the four manifolds is effectively divided into portions corresponding to the number of the cell blocks so that the potential difference between the respective portions and the peripheral surface of the cell blocks is reduced by the factor of the number of division for the cell blocks.

As shown in FIG. 3, an insulation pipe 55, such as a heat resistant and pressure-proof hose of fluorine-type, is disposed between the connection pipe 45 extending from the outside of the manifold 35 and the branch 65 of the gas supply line and maintained in place by a belt 77. As a result an insulation wall 55A is formed between the portion 45 and the branch 65, by which the leakage currents between one another of the cell blocks and between the cell blocks and the grounded pipe lines can be prevented. Also the voltage imposed on the insulation layer 74 of the manifold seal 39 can be reduced by the factor of the number of divisions of the cell blocks. Moreover, since the cell stack can be assembled with a block as the unit, assembly is facilitated. Furthermore, since the inspection, repair and replacement can be conducted block by block upon failure or the like of a unit cell, maintenance and repair is made easier. While the division into cell blocks tends to add to the fabrication cost, this is more than compensated for by the improvement in power generation efficiency obtained by the division, and by the saving of cost due to better yields and easier maintenance. It is usually considered appropriate to constitute each block with about 5-15 unit cells, although in special circumstances these limits may be breached.

Figure 4:
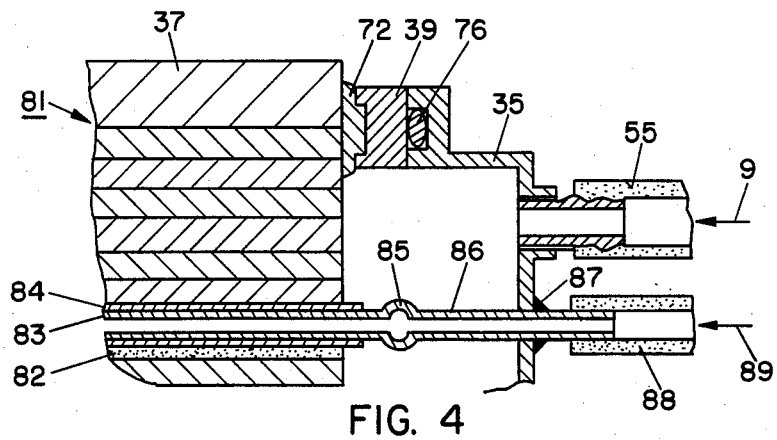
Figure 5:
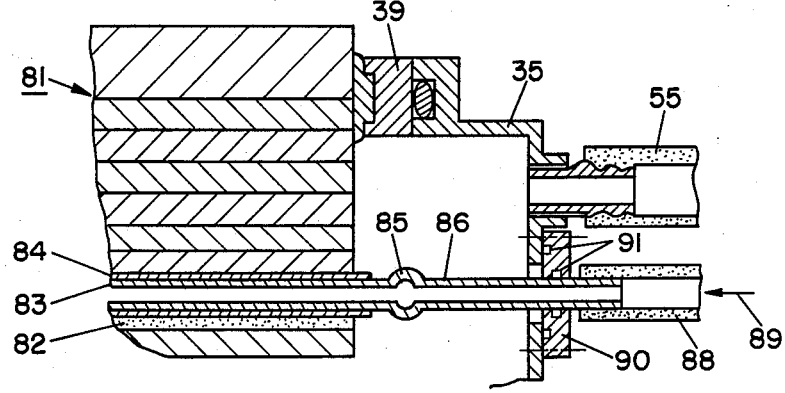

FIGS. 4 and 5 are cross sectional views for showing different techniques for liquid cooling the cell stacks in accordance with the invention. As shown in these figures, cooler assembly 82, of carbon plate and graphite plate or the like, is layered, for example, between groups of several unit cells of a cell block 81 comprising a lamination of unit cells, and cooling elements 83 comprising a plurality of cooling tubes having insulation coating 84 are disposed within a plurality of grooves formed in the cooler assembly 82. The cooling tubes of the cooling element 83 are connected by way of a header 85 to a conduit 86, which passes in a gas-tight manner through the manifold 35 and is then connected by means of an insulation pipe 88 to the supply and return line (not shown) for the cooling liquid. The cell block is adapted to be cooled by circulating the cooling liquid through the cooling element 83.

In the case of FIG. 4, since the liquid conduit 86 and the manifold 35 are conductively connected at a weld 87, the cooler assembly 82 and the cooling element 83 are insulated from each other by the insulation layer 84, and the different cell blocks are insulated by the insulation pipe portion 88. As a result, the leakage current generated between the cell blocks by the cooling system is reduced. Furthermore, as shown in FIG. 5, the conduit 86 and the manifold 35 may be insulated from each other by an insulation flange 90 and the gas tightness at the manifold 35 may be maintained by a seal member 91, such as an o-ring. In the case where the number of the unit cells in the cell block 81 is small, the cooling system may be interposed between the end plates 37 of adjacent cell blocks, whereby the header 85, the conduit 86 and the like may be disposed outside of the manifold 35, to simplify the structure of the cooling system.

It is to be understood that the specific embodiments described are illustrative of the basic principles of the invention. Various modifications will be apparent to the worker in the art consistent with the scope and spirit of the invention. For example, the structure or the gas system of the individual unit cells is not critical and other structures or gas systems may be substituted. Moreover, cooling is not essential and if employed may be done in a variety of ways.

I claim:

1. A fuel cell comprising a plurality of fuel cell blocks stacked together in a series arrangement, each cell block comprising a plurality of unit cells stacked together in a series arrangement, and gas supply means including at least one pair of manifolds for each cell block for supplying and for returning of one of the component reaction gases to the block, all of the supply manifolds of the one gas being connected to a common supply pipe and all of the return manifolds of the one gas being connected to a common return pipe and an electrical insulation barrier being interposed between each manifold and the common pipe to which it is connected, whereby each of the manifolds is electrically insulated from its cell block and from one another.

2. A fuel cell in accordance with claim 1, in which two pairs of manifolds are disposed about the periphery of each cell block, one pair for each of the two component reaction gases.

3. A fuel cell in accordance with claim 2, in which each cell block includes from five to fifteen unit cells and the cell includes at least three cell blocks.

4. A fuel cell in accordance with claim 1 which further includes a cooling system for flowing a liquid coolant between cell units, the elements of the cooling system being electronically insulated from the cell blocks and from the manifolds.

* * * * *